United States Patent
Sawahata

(10) Patent No.: US 7,454,276 B2
(45) Date of Patent: Nov. 18, 2008

(54) VEHICLE BEHAVIOR JUDGMENT SYSTEM AND VEHICLE OCCUPANT-PROTECTING SYSTEM

(75) Inventor: Toshikatsu Sawahata, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 185 days.

(21) Appl. No.: 11/039,995

(22) Filed: Jan. 24, 2005

(65) Prior Publication Data

US 2005/0165528 A1   Jul. 28, 2005

(30) Foreign Application Priority Data

Jan. 26, 2004   (JP) ............................. 2004-016824

(51) Int. Cl.
  G06F 17/00 (2006.01)
  B60R 21/00 (2006.01)
(52) U.S. Cl. .................. 701/38; 701/39; 701/45; 701/46; 701/47; 180/268; 180/271; 180/282; 280/5.502; 280/5.506; 280/5.507; 280/728.1; 280/734; 280/735
(58) Field of Classification Search .................. 701/38, 701/39, 45–47; 180/268, 271, 282; 280/5.502–5.507, 280/728.1, 734, 735
See application file for complete search history.

(56) References Cited

U.S. PATENT DOCUMENTS

| 5,610,575 | A |   | 3/1997  | Gioutsos |
| 5,890,084 | A | * | 3/1999  | Halasz et al. ................. 701/45 |
| 6,438,463 | B1|   | 8/2002  | Tobaru et al. |
| 6,560,519 | B2| * | 5/2003  | Williams et al. .............. 701/45 |
| 6,600,985 | B2| * | 7/2003  | Weaver et al. ................ 701/45 |
| 6,618,655 | B2| * | 9/2003  | Tobaru et al. ................. 701/45 |
| 6,650,981 | B2|   | 11/2003 | Sekizuka et al. |
| 6,701,276 | B2| * | 3/2004  | Kueblbeck et al. .......... 702/145 |
| 2002/0087235 | A1 | * | 7/2002 | Aga et al. ...................... 701/1 |
| 2002/0087243 | A1 |   | 7/2002 | Sekizuka et al. |
| 2002/0165654 | A1 |   | 11/2002| Weaver et al. |
| 2003/0004627 | A1 | * | 1/2003 | Williams et al. ............. 701/45 |
| 2003/0182042 | A1 | * | 9/2003 | Watson et al. ................ 701/45 |

FOREIGN PATENT DOCUMENTS

JP   2002-200962 A   7/2002

* cited by examiner

Primary Examiner—Jack W. Keith
Assistant Examiner—Chuong P Nguyen
(74) Attorney, Agent, or Firm—Foley & Lardner LLP

(57) ABSTRACT

A vehicle behavior judgment system comprising a rolling angular velocity detector adapted for detecting a rolling angular velocity of a vehicle, a rollover judgment device adapted for judging, based on at least a rolling angular velocity of a vehicle, whether the vehicle rolls over or not, and a noise-cutting filter adapted for removing a noise component from the rolling angular velocity.

11 Claims, 9 Drawing Sheets

VEHICLE BEHAVIOR JUDGMENT SYSTEM AND VEHICLE OCCUPANT-PROTECTING SYSTEM

BACKGROUND OF THE INVENTION (1) Field of the Invention

The present invention relates to a vehicle behavior judgment system and a vehicle occupant-protecting system using such a vehicle behavior judgment system. More particularly, the invention relates to improved rollover judgment based on at least the rolling angular velocity.

(2) Related Art Statement

There is known an occupant-protecting system which is adapted to protect an occupant from impact caused by rollover of a vehicle through operating an occupant-protecting device including an airbag system commencing with a curtain airbag, a seat belt pretensioner device and the like when the vehicle rolls over. See JP-A 2002-200962. As discussed in JP-A 2002-200962, the terms "rollover" and "roll over" used throughout herein include "turnover", "trip over", "flip over", "bounce over", "fall over", etc.

The occupant-protecting system for the vehicle judges whether the vehicle rolls over or not, based on two-dimensional values defined by a rolling angle and a rolling angular velocity (rolling rate), and controls the operation of the occupant-protecting device based on this judgment result as to "rollover".

In the technique of JP-A 2002-200962, the rolling angular velocity ω is mainly detected by a rolling angular velocity sensor (rolling angular velocity detector). The sensor may output a signal in which a noise component N is superposed upon a normal signal S representing an actual rolling angular velocity ω, when the sensor receives influences of high-frequency noise generated from a variety of devices such as an ignition plug of an engine mounted on the vehicle. The rolling angular velocity containing such a noise component N exhibits a value instantaneously projecting.

If whether rollover occurred or not is judged based on such an instantaneously projecting value, an erroneous judgment result may be generated, although the vehicle is actually not in a state resulting in rollover.

SUMMARY OF THE INVENTION

The present invention has been accomplished in view of the above circumstance, and is to provide a vehicle behavior judgment system capable of effecting accurate judgment as to "rollover" and a vehicle occupant-protecting system capable of operating such an occupant-protecting system even if the detected rolling angular velocity exhibits the above instantaneously projecting value under the influence of the noise.

A first vehicle behavior judgment system according to the present invention comprises a rolling angular velocity detector adapted for detecting a rolling angular velocity of a vehicle, and a rollover judgment device adapted for judging, based on at least a rolling angular velocity of a vehicle, whether the vehicle rolls over or not, and a noise-cutting filter adapted for removing a noise component from the rolling angular velocity.

The wording "based on at least a rolling angular velocity of a vehicle" means that the judgment may be "based on a rolling angular velocity alone" or "based on combination of a rolling angular velocity of a vehicle and other physical amount(s) (for example, rolling angle of the vehicle, etc.). This is applicable to other aspects of the present invention.

The noise component is a signal component, for example, which corresponds to a behavior never occurring in the actual vehicle, and such a noise component may be preliminarily empirically determined.

A second vehicle behavior judgment system according to the present invention comprises a rolling angular velocity detector adapted for detecting a rolling angular velocity of a vehicle, and a rollover judgment device adapted for judging, based on at least the rolling angular velocity of the vehicle detected by the rolling angular velocity detector, whether the vehicle rolls over or not, wherein if a difference between a newest rolling angular velocity and a just previous rolling angular velocity as viewed in a time series exceeds a preset threshold value with respect to the rolling angular velocities detected by the detector, the rollover judgment device replaces the newest rolling angular velocity by the just previous one and then effects judgment as to "rollover" of the vehicle by using the just previous rolling angular velocity instead of the newest one.

For example, 5 msec. is appropriate as a time interval at which the rolling angular velocities are detected in the time series. The preset threshold value has only to be a value which corresponds to a behavior never occurring in the actual vehicle, and such a threshold value may be appropriately 50 deg./sec. ($10 \times 10^3$ deg./sec.2 as converted in terms of the angular velocity), for example, when the given time interval is 5 msec.

A first vehicle occupant-protecting system according to the present invention comprises the first or second vehicle behavior judgment system as mentioned above, and an occupant-protecting device which protects the occupant through operating corresponding to a judgment result as to "rollover" obtained by the vehicle behavior judgment system.

A second vehicle occupant-protecting system according to the present invention comprises the first or second vehicle behavior judgment system as mentioned above, an inclination sensor adapted to detect whether the vehicle is inclined beyond a given inclination angle in a width direction of the vehicle or not, and an occupant-protecting device adapted for protecting the occupant through operating corresponding upon a judgment result as to "rollover" obtained by the vehicle behavior judgment system and a judgment result as to "inclination" obtained by the inclination sensor.

In the first and second vehicle occupant-protecting systems, the occupant-protecting device is intended to mean a variety of occupant-protecting devices operating for the purpose of protecting the occupant at the time of rollover of the vehicle, such as an airbag system commencing with a curtain airbag, a seat belt pretensioner device, an active rollover protection device and the like.

In the first and second vehicle occupant-protecting systems according to the present invention, the passage "operating corresponding upon a judgment result as to rollover" means, for example, (1): (a) a rolling operation by which the slacked seat belt is instantaneously rolled up and removed, or (b) a rollup rate during the rolling up operation is varied or (c) no rolling-up operation is effected, when the occupant-protecting device is the Beat belt pretensioner device and (2): (a) an inflating operation by which the airbag is inflated, or (b) an inflating rate of the airbag is varied during the inflating operation or (c) no inflating operation is effected, when the occupant-protecting device is the airbag system.

According to the first vehicle behavior judgment system of the present invention, since the noise-cutting filter removes any noise component corresponding to that behavior which would never occur in the actual vehicle, that is, a signal component such as an instantaneously projected value, from the rolling angular velocity signal detected by the rolling angular velocity detector, whether "rollover" occurred or not can be judged by using the rolling angular velocity from which such a noise component is removed. Thus, the accuracy in judgment of "rollover" can be enhanced.

According to the second vehicle behavior judgment system of the present invention, accuracy in the judgment of "rollover" can be also enhanced for the following reasons. That is, if a difference between the newest rolling angular velocity and the just previous rolling angular velocity exceeds a given threshold corresponding to a vehicle behavior never occurring in the actual vehicle with respect to the rolling angular velocities determined at every given time interval, that newest rolling angular velocity is a reliability-low value. In such a case, the rollover judgment device replaces that newest rolling angular velocity by the just previous rolling angular velocity as viewed in the time series, and judges, based on the just previous rolling angular velocity replacing the newest one or based on this just previous rolling angular velocity and other physical amount(s) (for example, a rolling angle), whether the vehicle rolls over or not. Thus, the accuracy in the judgment as to "rollover" can be enhanced.

According to the first vehicle occupant-protecting system of the present invention, since the occupant-protecting device effects the occupant-protecting operation based on the "rollover" judgment result having judgment accuracy enhanced with the vehicle behavior judgment system, accuracy in effecting the protecting operation can be enhanced.

According to the second vehicle occupant-protecting system of the present invention, since the occupant-protecting device also effects the occupant-protecting operation based on the "rollover" judgment result having judgment accuracy enhanced with the vehicle behavior judgment system, accuracy in effecting the protecting operation can be enhanced.

Further, since the detection result with the vehicle inclination sensor as to whether the vehicle is inclined beyond a given inclination angle in the width direction of the vehicle or not is combined with the judgment result with the above-mentioned vehicle behavior judgment result, the judgment accuracy can be further enhanced.

These and other objects, features and advantages of the invention will be appreciated upon reading of the description of the invention when in conjunction with the attached drawings, with the understanding that some modifications, variations and changes of the invention could be easily made by the skilled person in the art to which the invention pertains without departing from the spirit of the invention or the scope of the claims.

BRIEF DESCRIPTION OF THE DRAWINGS

For a better understanding of the invention, reference is made to the attached drawings.

PREFERRED EMBODIMENTS OF THE INVENTION

In the following, preferred embodiments of the vehicle behavior judgment system and the vehicle occupant protecting system using such a vehicle behavior judgment system according to the present invention will be explained with reference to drawings attached hereto.

Figure 1:
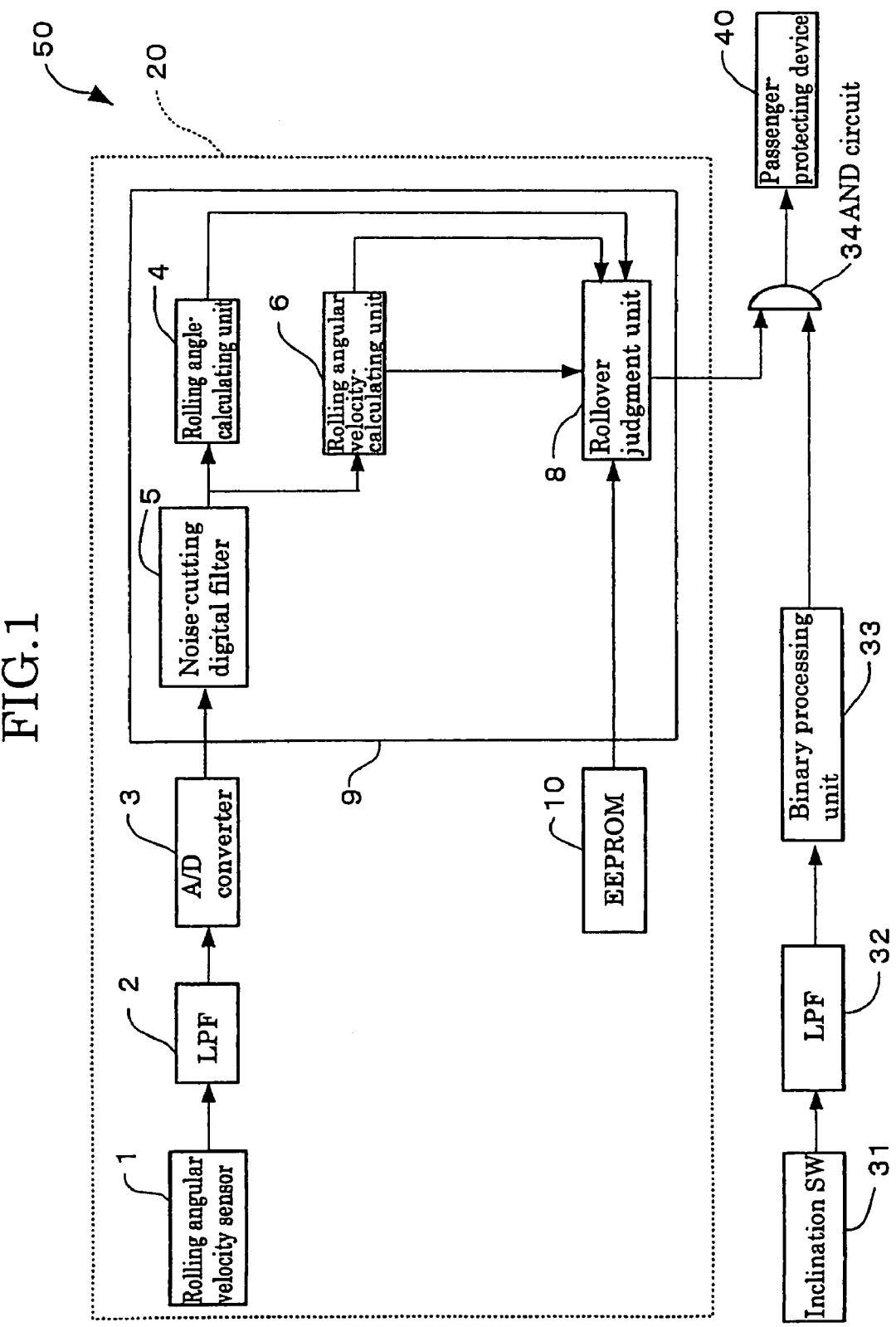
FIG. 1 is a block diagram showing a vehicle behavior judgment system and a vehicle occupant-protecting system according to one embodiment of the present invention.

As shown in FIG. 1, the occupant-protecting system 50 according to an embodiment according to the present invention comprises a vehicle behavior judgment system 20 of the present invention as a part thereof. This vehicle behavior judgment system 20, which is mounted on a vehicle not shown, comprises a rolling angular velocity sensor 1 (rolling angular velocity detector) for detecting a signal corresponding to a rolling angular velocity $\omega(i)$ of the vehicle, a rolling angle calculator 4 for calculating a rolling angle $\theta(i)$ based on the signal detected with the rolling angular velocity sensor 1, a rolling angular velocity calculator 6 for calculating a rolling angular velocity $\omega(i)$ by removing a noise component from the signal detected by the rolling angular velocity sensor 1, and a rollover judgment unit 8 for judging whether the vehicle rolls or not, based on the rolling angle $\theta(i)$ and the rolling angular velocity $\omega(i)$.

The rolling angle calculator 4, the rolling angular velocity calculator 6 and the rollover judging unit 8 are built in a microcomputer 9.

More particularly, the rolling judgment system 20 further comprises a low pass filter (hereinafter referred to as LPF) 2 for removing high frequency noise from a signal detected with the rolling angular velocity sensor 1 and an A/D converter 3 for effecting digital conversion of an analogue output passing the LPF 2 according to a given sampling cycle of 5 msec, for example. The rolling angle-calculating unit 4 calculates a rolling angle $\theta(i)$ based on the digital output value from the A/D converter 3.

Further, the control unit 9 comprises a noise-cutting digital filter 5 for cutting noises from the digital output values from the A/D converter. The rolling angle-calculating unit 4 calculates a noise-removed rolling angle $\theta(i)$ based on the output of the noise-cutting digital filter 5. The rolling angular velocity-calculating unit 6 calculates a noise-removed rolling angular velocity $\omega(i)$ based on the output from the noise-cutting digital filter 5.

Figure 2A:
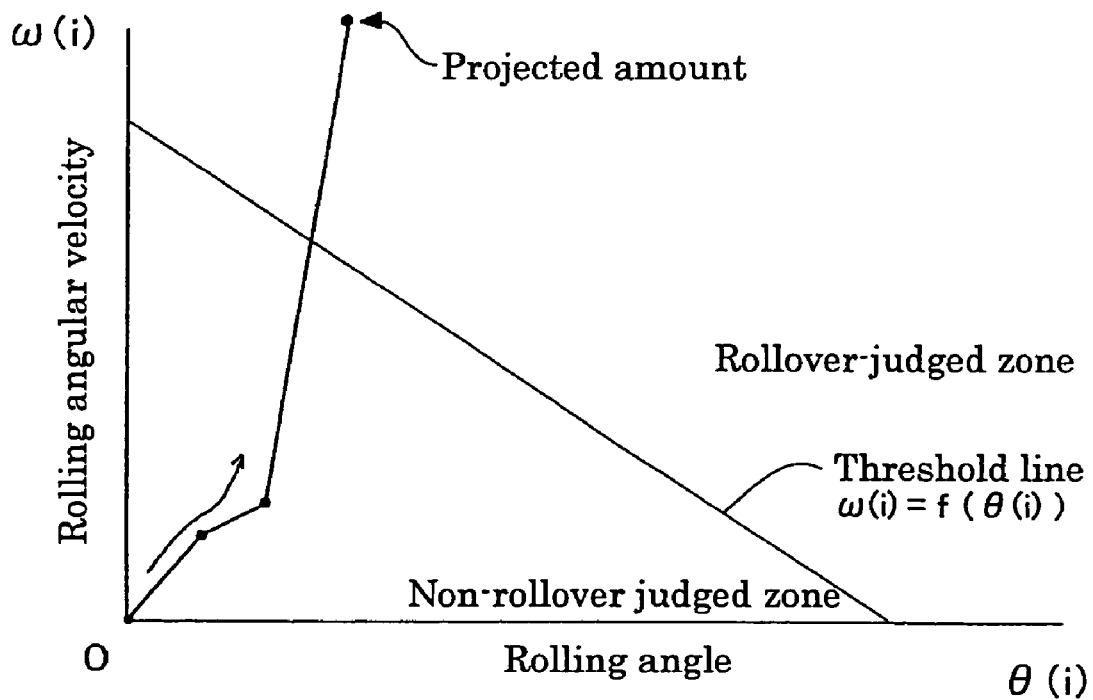
FIGS. 2(a) and 2(b) are graphs showing a threshold line in connection with the rolling angle and the rolling angular velocity.
Figure 2B:
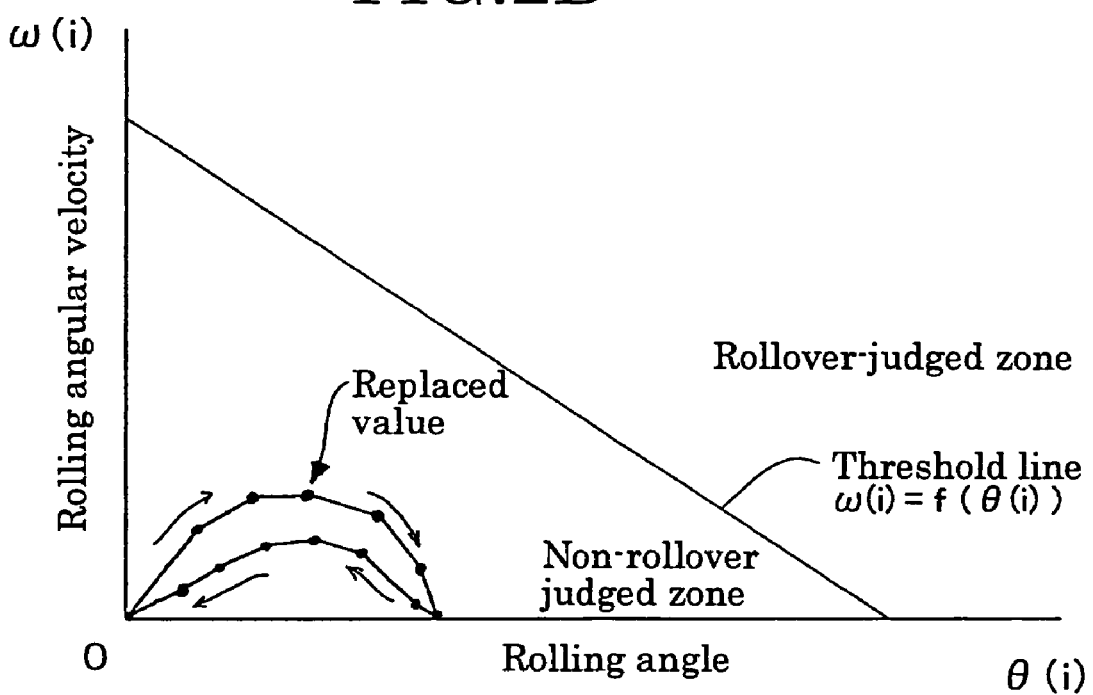

The vehicle behavior judgment system 20 further comprises an EEPROM 10 which stores threshold values with respect to the rolling angle $\theta(i)$ and the rolling angular velocity $\omega(i)$ and a threshold value $\Delta\omega 0$ for change rates $\Delta\omega(=\omega(i)-\omega(i-1))$ with lapse of time, the threshold values being compared when the rolling judgment unit 8 judges whether the vehicle rolls over or not. The threshold values for the rolling angle $\theta(i)$ and the rolling angular velocity $\omega(i)$ are stored as a threshold line represented by a function $\omega(i) = f(\theta(i))$ between the rolling angle $\theta(i)$ and the rolling angular velocity $\omega(i)$ as shown in FIGS. 2(a) and 2(b). The rollover judgment unit 8 judges that the vehicle is rolling if a two-dimensional point (coordinate point) defined by the rolling angle θ(i) and the rolling angular velocity ω(i) actually obtained is located above the threshold line (judgment of "rolling over"), whereas it judges that the vehicle is not rolled over if the two-dimensional value (coordinate point) is located under the threshold line (judgment of "not rolled over").

On the other hand, if the change rate Δω with lapse of time of the rolling angular velocity ω(i) exceeds the threshold value Δω0 stored in the EEPROM 10, the rollover judgment unit 8 replaces the newest calculated rolling angular velocity ω(i) with that of ω(i−1) calculated just one before as viewed in a time series, and thereafter judges whether the vehicle is rolling or not, based on the rolling angle θ(i) and the rolling angular velocity ω(i−1) having replaced the newest one.

The threshold value Δω0 is a value never indicated in a "normal vehicle rollover behavior". For example, the threshold value Δω0 is set at 50 deg/sec., which corresponds to $10 \times 10^3$ deg/sec.2 when calculated in terms of rolling angular acceleration $\alpha = [\omega(i) - \omega(i-1)]/\Delta t$ in case that the calculation of the rolling angular velocity is calculated every time interval of 5 msec. in this embodiment.

Further, in addition to the vehicle behavior judgment system 20, the occupant-protecting system 50 comprises an occupant-protecting device 40, which is adapted to protect an occupant upon operation in response to a rollover judgment result obtained with the vehicle behavior judgment system 20.

As the occupant-protecting device 40, the vehicle is equipped with an air bag system including a curtain air bag and/or a seat belt pretensioner device.

Further, the occupant-protecting system 50 comprises an inclination SW 31 (inclination sensor) for detecting whether the vehicle inclines at a given angle in a width direction of the vehicle or not, an LPF 32 for preventing chattering with an output from the inclination SW 31, a binary processing unit 33 for binarily converting outputs from the LPF 32 into binary inclination ON signals and inclination OFF signals and outputting the inclination ON signals only, and an AND circuit 34 for outputting operating instruction signals to the occupant-protecting device 40 under an AND condition (the inclination ON signals and the rollover judgment) only between the outputs of the binary processing unit 33 and the rollover judgment result of the vehicle behavior judgment system 20.

Figure 3:
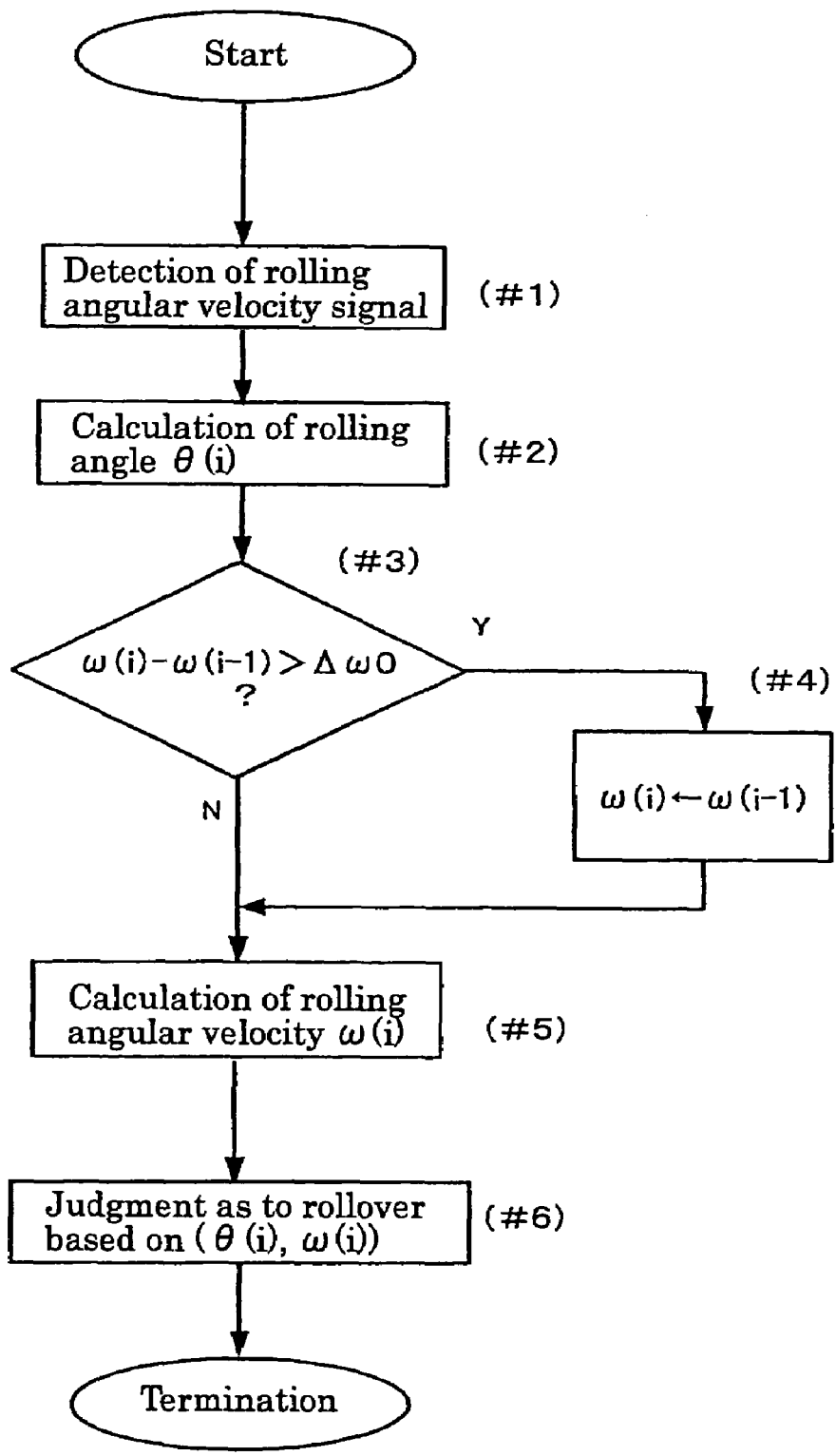
FIG. 3 is a flow chart showing a function of a rollover judgment system shown in FIG. 1.

Next, the function of the vehicle behavior judgment system 20 according to this embodiment of the present invention will be explained by using the block diagram of FIG. 1 and a flow chart of FIG. 3.

First, the rolling angular velocity sensor 1 continuously detects signals S corresponding to rolling angular velocities ω(i) of the vehicle (#1), and the detected signals S are inputted into the LPF 2, which output signals to the A/D converter 3 after cutting high-frequency noises in an analogue signal zone from the inputted signals S. The A/D converter 3 converts the inputted signals S to digital signals D every sampling interval such as 5 (msec.), and the noise-cutting digital filter 5 of the microcomputer 9 removes noise components in a digital signal region from digital signals D outputted from the A/D converter 3, and the rolling angular velocity calculator 6 calculates rolling angular velocities ω(i) every time interval of 5 (msec.) based on the noise removed digital signals D (#2).

The rolling angle θ(i) and the rolling angular velocity ω(i) as respectively calculated by the above operations are inputted into the rollover judgment unit 8, which calculates the change amount Δω(=ω(i)−ω(i−1)) with lapse of time of the inputted rolling angular velocity and makes comparison as to which is larger, the calculated change amount Δω(=ω(i)−ω(i−1)) with lapse of time of the inputted rolling angular velocity or the threshold value Δω0 preliminarily stored in the EEPROM 10 for the change amount Δω with lapse of time of the rolling angular velocity ω(#3).

If the comparison reveals that the calculated change amount Δω with lapse of time of the rolling angular velocity ω is greater than the threshold value Δω0, the rollover judgment unit 8 judges that the vehicle behavior is a vehicle behavior never normally occurring. That is, the rollover judgment unit 8 judges that the signal S detected by the rolling angular velocity sensor 1 is a reliability-low signal due to influence of noise, Thus, the rollover judgment unit 8 replaces the newest rolling angular velocity ω(i) by the just previous rolling angular velocity ω(i−1) as viewed in the time series (#4). On the other hand, if the calculated change amount Δω with lapse of the rolling angular velocity ω is not greater than the threshold value Δω0, the above replacement (#4) is not carried out.

When the rolling judgment unit 8 makes the replacement in Step 4 (#4), the rolling angle calculating unit 4 is controlled so that the rolling angle θ(i) may be calculated based on the replacing rolling angular velocity ω(i−1). Thus, the rolling angle calculator 4 calculates the rolling angle θ(i) based on the just previous rolling angular velocity replacing the newest one (#5), and the calculated rolling angle θ(i) is inputted into the rollover judgment unit 8.

On the other hand, if the replacement is not effected, the rollover judgment unit 8 controls the rolling angle-calculating unit 4 such that the rolling angle-calculating unit 4 may calculate the rolling angle θ(i) based on a digital signal D issued after the removal of the noise with the noise-cutting digital filter 5. According to this control, the rolling angle-calculating unit 4 calculates the rolling angle θ(i) (#5), and the calculated rolling angle θ(i) is inputted into the rollover judgment unit 8.

The rolling angle-calculating unit 4 effects time integration to calculate the rolling angle θ(i) every 5 msec.

The rollover judgment unit 8 compares in magnitude the threshold line defined by the rolling angles θ and the rolling rates ω and preliminarily stored in the EEPROM 10 (See FIGS. 2(a) and 2(b)) with two-dimensional values (θ(i), ω(i)) of the rolling angles θ(i) and the rolling angular velocities ω(i) determined in the above processing, thereby determining whether the vehicle rolls over or not (#6).

The rollover is concretely judged in #6 such that if the coordinate point (ω(i), ω(i)) defined by the rolling angle θ(i) and the rolling rate ω(i) inputted is located in an upper zone above the threshold line shown in FIGS. 2(a) and 2(b) (rolling-judged zone), it is judged that the vehicle rolls over, whereas if this coordinate point (θ(i), ω(i)) is located in a lower zone under the threshold line shown in FIGS. 2(a) and 2(b) (non-rolling judged zone), it is judged that the vehicle is not rolled over.

The judgment result as to "rolling" obtained in Step 6 (#6) is outputted into the AND circuit 34.

In this way, even if it is erroneously judged according to the conventional method based on an instantaneously projecting value (See FIG. 2(a)) of the calculated rolling angular velocity ω(i) due to the noise or the like of the vehicle that the vehicle is rolled over, the rollover judgment accuracy can be enhanced in the vehicle behavior judgment system 20 according to the embodiment of the present invention since the rollover judgment unit 8 judges in #6 whether the vehicle is rolling or not, after the rollover judgment unit 8 replaces the newest rolling angular velocity ω(i), which never occurs in the actual vehicle, by the just previous rolling angular velocity ω(i−1) as viewed in the time series (#4, FIG. 2(b)).

On the other hand, the AND circuit 34 of the occupant-protecting system 50 according to this embodiment receives an inclination-detected result, which is detected by the inclination SW 31 and passes the binary processing unit 33 via the LPF 32 for preventing the chattering, as well as the judgment result as to rolling" by the vehicle behavior judgment system 20.

When the AND condition that the vehicle behavior judgment system 20 judges the vehicle is rolling over and the inclination SW judges the vehicle is inclined (inclination ON signal) is met, the AND circuit 34 outputs an operating signal into the occupant-protecting device 40 so that the device 40 may be operated based on this signal. Otherwise, the AND circuit will not output such an operating signal to the occupant-protecting device 40.

When the operating signal is inputted to the occupant-protecting device 40 from the AND circuit 34, the device 40 effects the occupant-protecting operation. On the other hand, when no operating signal is inputted, the device will not effect the occupant protecting operation.

As mentioned above, according to the occupant-protecting system 50 of the present embodiment, the operating accuracy of the occupant-protecting device can be enhanced through increased judgment accuracy as to "rollover" with the vehicle behavior judgment system 20.

Further, since the system is operated under the operating condition combined with the inclination detection result obtained by the inclination SW 31, the operating reliability can be further enhanced.

Figure 4:
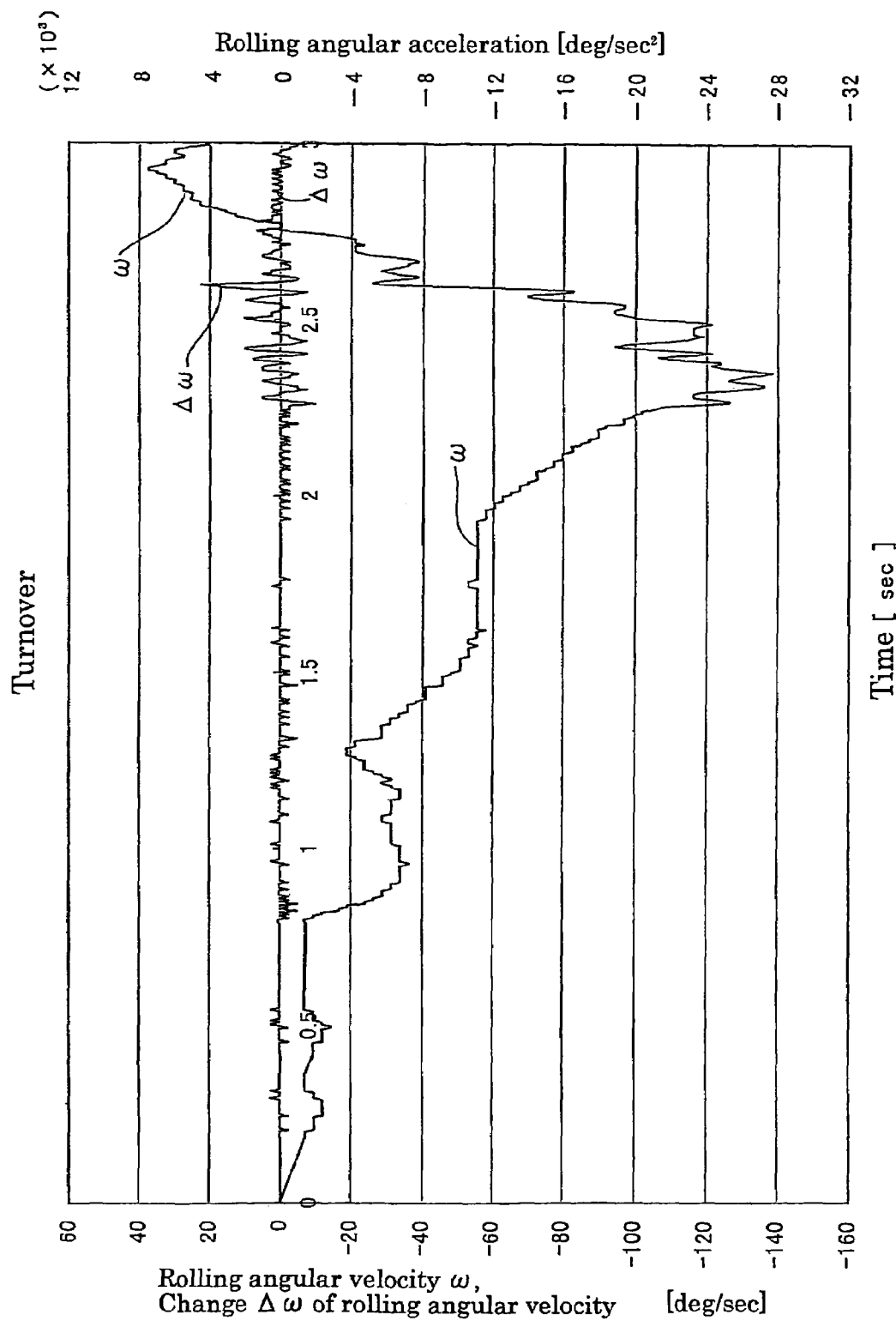
FIG. 4 is an empirical graph showing change amounts of the rolling angular velocity in turnover type rollover with lapse of time.
Figure 5:
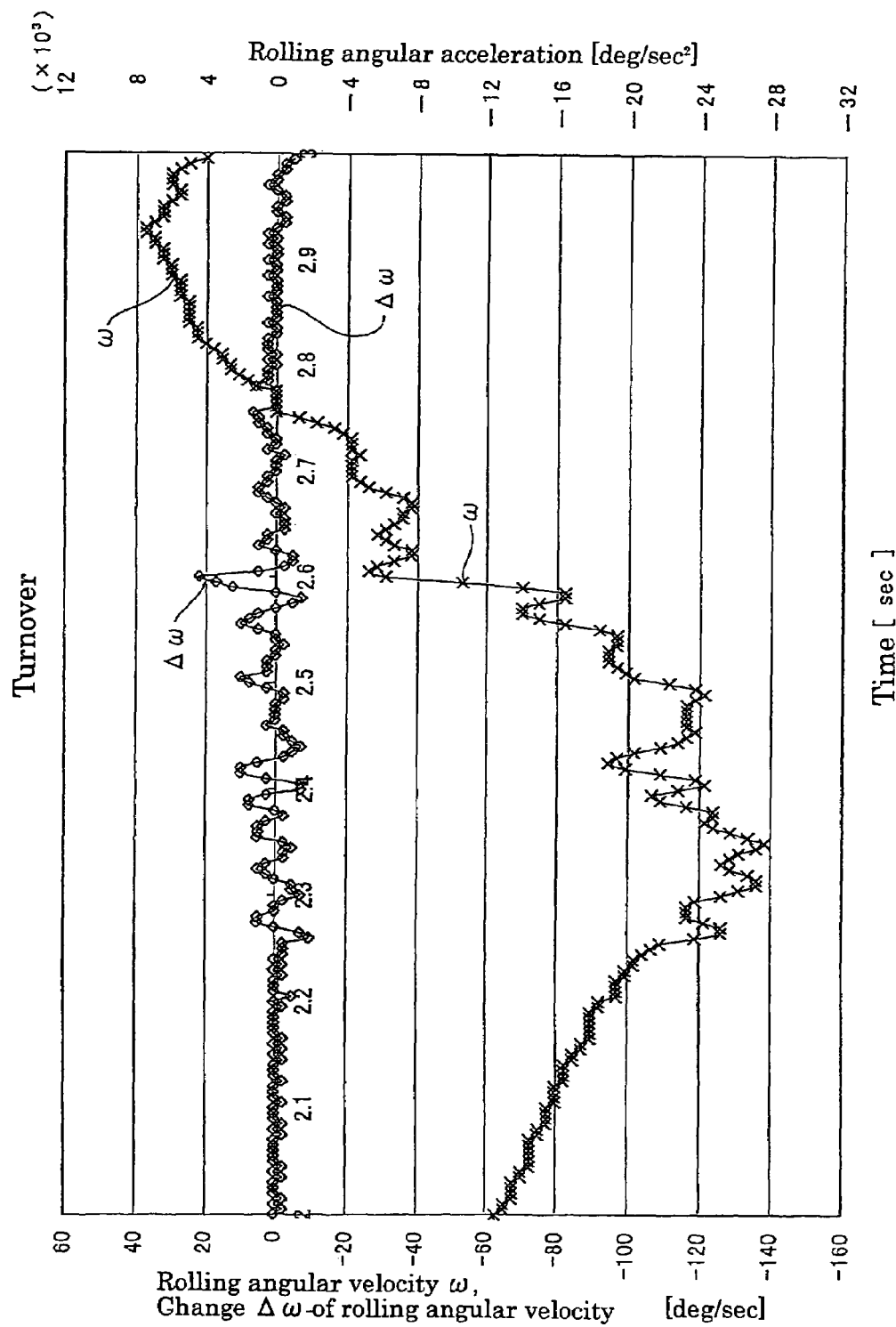
FIG. 5 is a graph showing an enlargement of a region in a given time interval of Fig 4.

FIGS. 4 to 9 show experimental results obtained for setting the threshold value $\Delta\omega 0$ of the change amount $\Delta\omega$ with lapse of time of the rolling angular velocity. FIG. 4 is a graph showing change amounts $\Delta\omega$(deg./sec.) with lapse of time of the rolling angular velocity $\omega$ at every time interval of 5 msec. in turnover type rollover among various rollover variations of the vehicle. FIG. 5 is a graph showing an enlargement of a region in a time interval from 2.0 sec. to 3.0 sec. in FIG. 4. An ordinate at a right side of each graph denotes values obtained by converting time-change amounts $\Delta\omega$(deg./sec.) of the rolling angular velocity $\omega$ into the angular acceleration ($\Delta\omega/\Delta t$ [deg./sec.2]). The above is applicable to the other graphs mentioned later.

Figure 6:
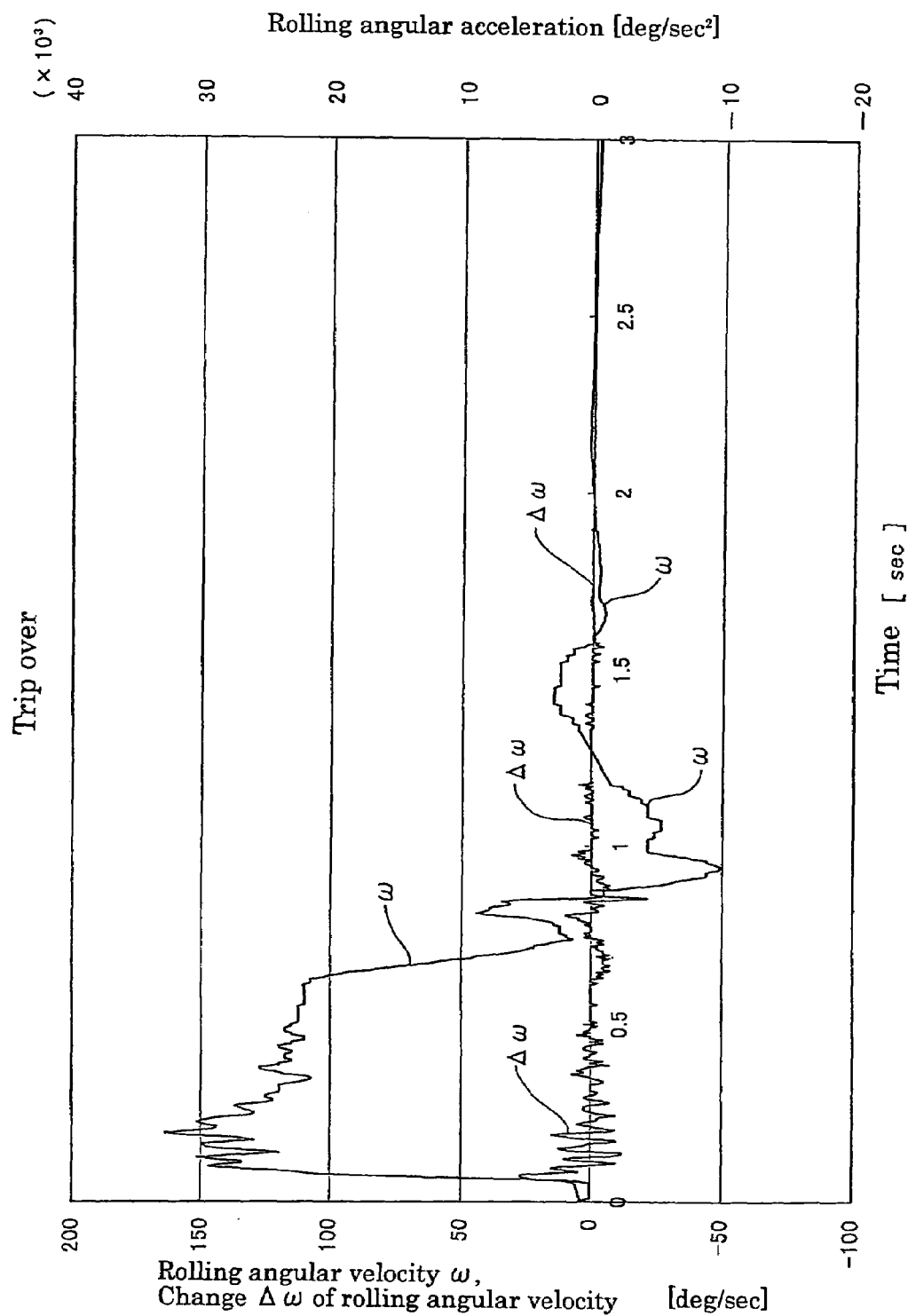
FIG. 6 is a graph showing change amounts of the rolling angular velocity in trip over type rolling with lapse of time.
Figure 7:
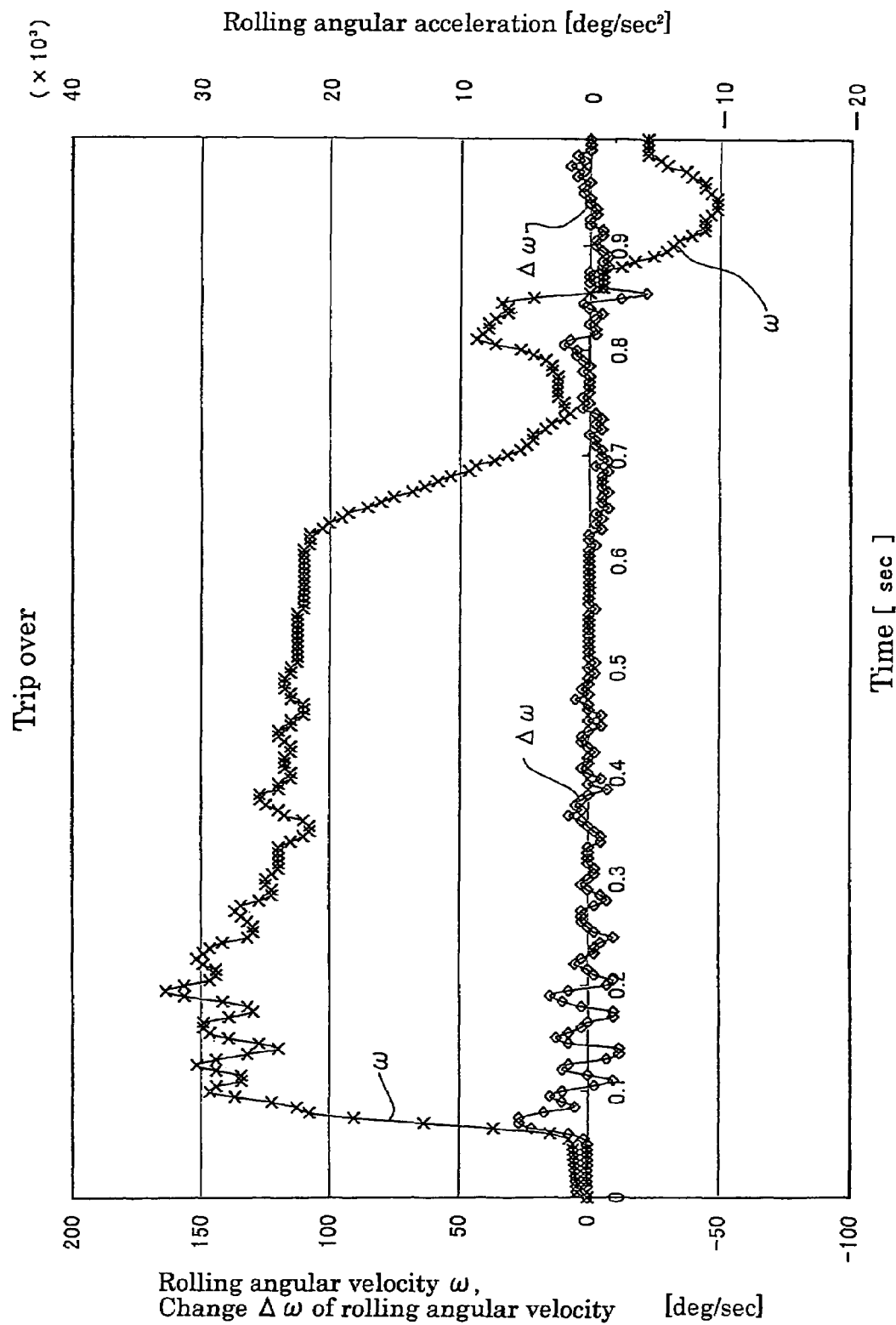
FIG. 7 is a graph showing an enlargement of a region in a given time interval of FIG. 6.

FIG. 6 is a graph showing change amounts $\Delta\omega$(deg./sec.) with lapse of the rolling angular velocity $\omega$ at every time interval of 5 msec. in tripover type rollover among various rollover variations of the vehicle. FIG. 7 is a graph showing an enlargement of a region in a time interval from 0.0 sec. to 1.0 sec. in FIG. 6.

Figure 8:
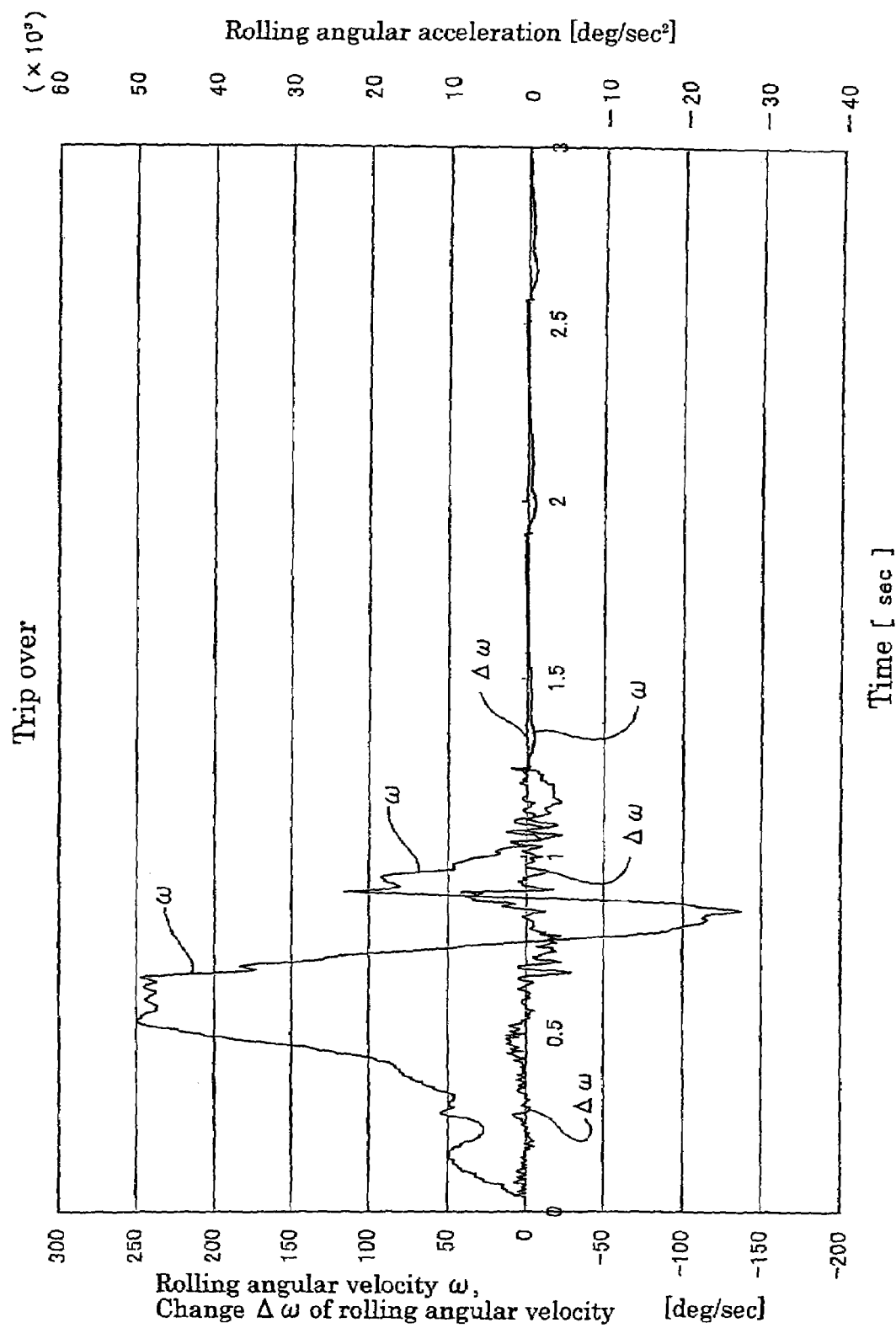
FIG. 8 is a graph showing change amounts of the rolling angular velocity in another trip over type rolling with lapse of time.
Figure 9:
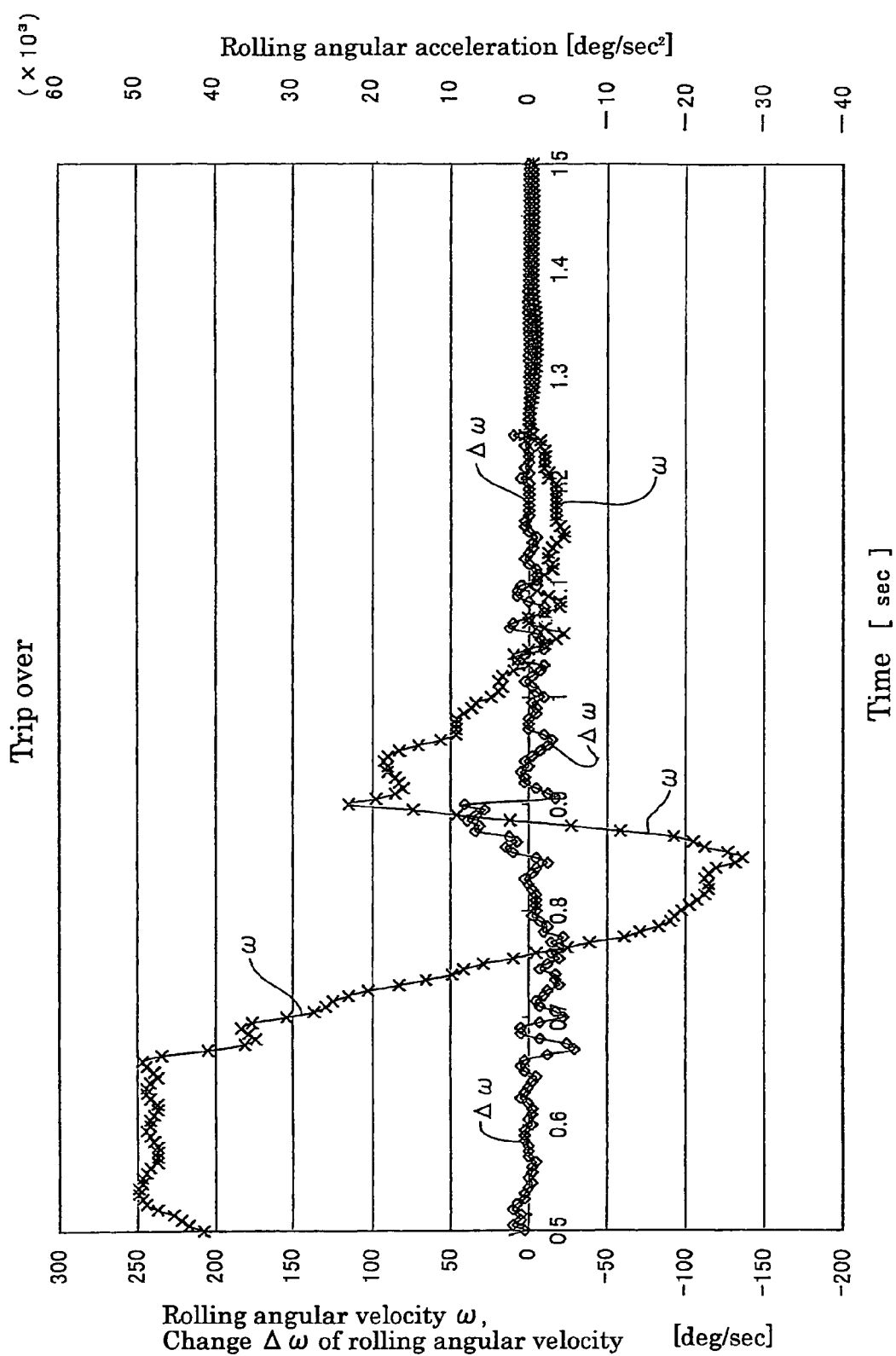
FIG. 9 is a graph showing an enlargement of a region in a given time interval of FIG. 8.

FIG. 8 is a graph showing change amounts $\Delta\omega$(deg./sec.) with lapse of time of the rolling angular velocity $\omega$ at every time interval of 5 msec. in another tripover type rollover among various rollover variations of the vehicle. FIG. 9 is a graph showing an enlargement of a region in a time interval from 0.5 sec. to 1.5 sec. in FIG. 8.

From these experimental results, it is confirmed that 50 (deg./sec.) ($10\times10^3$ (deg./sec.2) when converted to rolling acceleration) is appropriate as the threshold value $\Delta\omega 0$ for the time-change amount $\Delta\omega$ of the rolling angular velocity $\omega$ for a time interval of 5 msec., the threshold value corresponding to a case which is not indicated in the normal rollover behavior of the vehicle.

In the vehicle behavior judgment system according to the present invention, the threshold value is not limited to the above specific value, and can be appropriately adjusted depending upon behavior characteristics of the vehicle upon which the vehicle behavior judgment system is mounted.

In the occupant-protecting system 50 of the present embodiment, the occupant-protecting device 40 is operated based on the rollover judgment result obtained by the vehicle behavior judgment system 20 and the inclination-detected result obtained by the inclination SW 31. Such an inclination-detected result is combined to ensure the higher accuracy operation. In the vehicle occupant-protecting system according to the present invention (the first vehicle occupant-protecting system of the present invention), however, it is not always necessary that the occupant-protecting device 40 is operated under combination of the inclination-detected result. The occupant-protecting device 40 may be operated depending only upon the judgment result of the rollover judgment result of the rollover judgment system.

What is claimed is:

1. A vehicle behavior judgment system comprising:
   a rolling angular velocity detector adapted for detecting rolling angular velocities in a time series of a vehicle,
   a rollover judgment device adapted for judging, based on at least one rolling angular velocity of the vehicle detected by the rolling angular velocity detector, whether the vehicle rolls over or not, and
   a noise-cutting filter adapted for removing a noise component from the rolling angular velocities,
   wherein, if a difference between a newest rolling angular velocity and a just previous rolling angular velocity as viewed in the time series exceeds a threshold value, the rollover judgment device is configured to replace the newest rolling angular velocity with the just previous rolling angular velocity and then to effect judgment as to "rollover" of the vehicle by using the just previous rolling angular velocity instead of the newest rolling angular velocity.

2. The vehicle behavior judgment system set forth in claim 1, which further comprises a rolling angle calculator for calculating a rolling angle based on signals from the rolling angular velocity detector via the noise-cutting filters, and
   wherein the rollover judgment device is adapted for judging, based on the at least one rolling angular velocity and the calculated rolling angle of the vehicle, whether the vehicle rolls over or not.

3. The vehicle behavior judgment system set forth in claim 1, wherein the noise component is a signal component which corresponds to a behavior never occurring in the actual vehicle.

4. The vehicle behavior judgment system set forth in claim 1, wherein the threshold value is a value which corresponds to a behavior never occurring in the actual vehicle.

5. A vehicle occupant-protecting system comprising:
   a vehicle behavior judgment system, wherein the vehicle behavior judgment system comprises:
   a rolling angular velocity detector adapted for detecting rolling angular velocities in a time series of a vehicle,
   a rollover judgment device adapted for judging, based on at least one rolling angular velocity of the vehicle detected by the rolling angular velocity detector, whether the vehicle rolls over or not, and
   a noise-cutting filter adapted for removing a noise component from the rolling angular velocities,
   wherein, if a difference between a newest rolling angular velocity and a just previous rolling angular velocity as viewed in the time series exceeds a threshold value, the rollover judgment device is configured to replace the newest rolling angular velocity with the just previous rolling angular velocity and then to effect judgment as to "rollover" of the vehicle by using the just previous rolling angular velocity instead of the newest rolling angular velocity, and an occupant-protecting device which protects an occupant through an operation corresponding to a judgment result as to "rollover" obtained by the vehicle behavior judgment system.

6. The vehicle occupant-protecting system set forth in claim 5, wherein the occupant-protecting device is selected from at least one of an airbag system, a seat belt pretensioner device, and an active rollover device.

7. The vehicle occupant-protecting system set forth in claim 5, which further comprises an inclination sensor adapted to detect whether the vehicle is inclined beyond a given inclination angle in a width direction of the vehicle or not, and wherein the occupant-protecting device is adapted for protecting the occupant through an operation corresponding to a judgment result as to "rollover" obtained by the vehicle behavior judgment system and a judgment result as to "inclination" obtained by the inclination sensor.

8. A vehicle occupant-protecting system set forth in claim 5, wherein the threshold value is a value which corresponds to a behavior never occurring in the actual vehicle.

9. The vehicle occupant-protecting system set forth in claim 8, which further comprises an inclination sensor adapted to detect whether the vehicle is inclined beyond a given inclination angle in a width direction of the vehicle or not, and wherein the occupant-protecting device is adapted for protecting the occupant through an operation corresponding to a judgment result as to "rollover" obtained by the vehicle behavior judgment system and a judgment result as to "inclination" obtained by the inclination sensor.

10. A vehicle occupant-protecting system comprising:

a vehicle behavior judgment system, wherein the vehicle behavior judgment system comprises:

a rolling angular velocity detector adapted for detecting rolling angular velocities in a time series of a vehicle, a rollover judgment device adapted for judging, based on at least one rolling angular velocity of the vehicle detected by the rolling angular velocity detector, whether the vehicle rolls over or not, and a noise-cutting filter adapted for removing a noise component from the rolling angular velocities, wherein, if a difference between a newest rolling angular velocity and a just previous rolling angular velocity as viewed in the time series exceeds a threshold value, the rollover judgment device is configured to replace the newest rolling angular velocity with the just previous rolling angular velocity and then to effect judgment as to "rollover" of the vehicle by using the just previous rolling angular velocity instead of the newest rolling angular velocity, an inclination sensor adapted to detect whether the vehicle is inclined beyond a given inclination angle in a width direction of the vehicle or not, and an occupant-protecting device adapted for protecting an occupant through an operation corresponding to a judgment result as to "rollover" obtained by the vehicle behavior judgment system and a judgment result as to "inclination" obtained by the inclination sensor.

11. The vehicle occupant-protecting system set forth in claim 10, wherein the occupant-protecting device is selected from at least one of an airbag system, a seat belt pretensioner device, and an active rollover device.

* * * * *